United States Patent
Tai et al.

(10) Patent No.: US 6,782,755 B2
(45) Date of Patent: Aug. 31, 2004

(54) SURFACE-MICROMACHINED PRESSURE SENSOR AND HIGH PRESSURE APPLICATION

(75) Inventors: Yu-Chong Tai, Pasadena, CA (US); Yong Xu, Royal Oak, MI (US); Fukang Jiang, Pasadena, CA (US)

(73) Assignees: California Institute of Technology, Pasadena, CA (US); Schlumberger Technology Corporation, Ridgefield, CT (US)

( * ) Notice: Subject to any disclaimer, the term of this patent is extended or adjusted under 35 U.S.C. 154(b) by 0 days.

(21) Appl. No.: 09/900,743

(22) Filed: Jul. 6, 2001

(65) Prior Publication Data

US 2002/0053242 A1 May 9, 2002

Related U.S. Application Data

(60) Provisional application No. 60/216,910, filed on Jul. 6, 2000.

(51) Int. Cl.[7] .............................................. G01L 9/16
(52) U.S. Cl. .............................. 73/754; 73/708; 73/727
(58) Field of Search ....................... 73/777, 727, 706, 73/715, 724, 718, 721, 726, 753–756, 708; 364/508; 338/4

(56) References Cited

U.S. PATENT DOCUMENTS

| | | | |
|---|---|---|---|
| 4,864,724 A | | 9/1989 | Bergstrom .................... 29/854 |
| 5,591,679 A | | 1/1997 | Jakobsen et al. ............ 487/228 |
| 5,637,905 A | * | 6/1997 | Carr et al. .................... 257/418 |
| 5,719,069 A | | 2/1998 | Sparks ........................... 437/59 |
| 5,736,430 A | | 4/1998 | Seefeldt et al. ............... 438/53 |
| 5,861,558 A | * | 1/1999 | Buhl et al. .................... 73/777 |
| 5,872,315 A | * | 2/1999 | Nagase et al. ................ 73/726 |
| 6,058,782 A | * | 5/2000 | Kurtz et al. .................. 73/727 |
| 6,068,394 A | * | 5/2000 | Dublin, Jr. .................. 364/508 |
| 6,240,785 B1 | * | 6/2001 | Chapman et al. ............. 73/727 |
| 6,327,911 B1 | * | 12/2001 | Kurtz et al. .................. 73/727 |
| 6,338,284 B1 | * | 1/2002 | Najafi et al. ................ 73/866.1 |
| 6,378,378 B1 | * | 4/2002 | Fisher .......................... 73/754 |
| 6,470,754 B1 | * | 10/2002 | Gianchandani .............. 73/718 |

\* cited by examiner

*Primary Examiner*—Edward Lefkowitz
*Assistant Examiner*—Alandra Ellington
(74) *Attorney, Agent, or Firm*—Fish & Richardson P.C.

(57) ABSTRACT

A surface-micromachined high-pressure sensor, formed by forming a cavity using a sacrificial layer. The sacrificial layer can be reflowed to make the edges of the cavity more rounded. The material that is used for the diaphragm can be silicon nitride, or multiple layers including silicon nitride and other materials. The pressure sensor is intended to be used in high pressure applications, e.g. pressure is higher than 6000, 10,000 or 30,000 P.S.I.

27 Claims, 8 Drawing Sheets

SURFACE-MICROMACHINED PRESSURE SENSOR AND HIGH PRESSURE APPLICATION

CROSS-REFERENCE TO RELATED APPLICATIONS

The present application claims priority to provisional application No. 60/216,910, filed Jul. 6, 2000.

BACKGROUND

Pressure sensors may be used in various environments. A pressure sensor may detect the pressure in oil wells, automobile environments, and others, for example. This detection of pressure is conventionally used to determine the amount of oil remaining in the oil well. An oil well, however, may be a relatively harsh environment. Use in an oil well may require operation at high-pressure, for example 10,000 psi, and at high operating temperatures, e.g. 150 degrees C.

Surface micromachined pressure sensors are known. However, the design and process of many of these sensors have been optimized for low pressure applications.

Certain high-pressure sensors have been reported using silicon "bulk" micromachining. This technology has a number of disadvantages. A serious problem is the difficulty of overpressure protection so that the diaphragm may crack if an over range pressure is applied. Also, the thickness and dimension of the diaphragm, which are essential for the performance of the pressure sensor, is difficult to control precisely by bulk micromachining. Bulk micromachined sensors also often require wafer bonding, which sometimes introduces a thermal mismatch problem.

In contrast, a surface micromachined high-pressure sensor has inherent overpressure protection and more precise dimension control. In addition, the device may also be able to be formed in a smaller size and there is no need for wafer bonding and double-side alignment. Moreover, the process may be no more complicated than other similar systems.

SUMMARY

The present system describes a surface micromachined pressure sensor that may be operable in high-pressure, high temperature applications. The sensor as disclosed herein preferably has structure capable of operation at pressures higher than 6000 psi, and in fact, the present system may be usable at a pressure range of 10,000 psi, 14000 psi, or even 30000 psi or higher.

In an embodiment, the device may be a device with a silicon nitride diaphragm, using the piezoresistive operating principle. Special techniques are disclosed to enable small size, inherent overpressure protection, precise dimension control, ease of packaging, and others.

BRIEF DESCRIPTION OF THE DRAWINGS

These and other aspects will now be described in detail with reference to the accompanying drawings, wherein.

DETAILED DESCRIPTION

An embodiment described herein describes a surface micromachined, nitride based diaphragm which may be substantially 1–5 um, e.g. 3 um in thickness. In the disclosed embodiment, the nitride used includes silicon nitride, e.g., SiN. This device may have a diaphragm diameter of 44 microns, or more. The device may be usable for sensing pressure within an oil well or in other pressure sensing applications.

Figure 1:
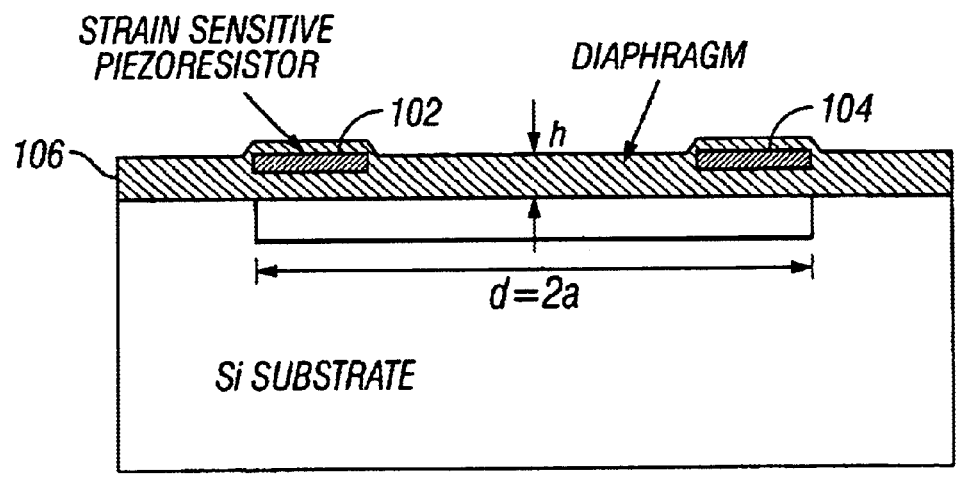
FIG. 1 shows a cross-section of the first embodiment.

FIG. 1 shows a cross-section of the surface micromachined piezoresistive high-pressure sensor according to an embodiment. Strain sensitive resistors 102, such as polysilicon piezoresistors, may be placed in a location where they are sensitive to the strain caused by diaphragm movement. Other materials, such as platinum, can also be used. In a cross-diagram section, strain sensitive resistors 102, 104 are shown within a diaphragm 106, that is formed of a flexible material. That material may be silicon nitride.

The strain sensitive resistors may be formed of deposited polysilicon that is buried in the silicon nitride diagram. This may compare with previous systems which may have used diffused or ion implanted resistors in a single crystal silicon substrate. As compared with those previous systems, the current deposited polysilicon resistors may achieve better high temperature stability.

The diaphragm itself may be formed of low-pressure chemical vapor deposited silicon nitride. This material may have significant advantages, including a relatively large fracture strain, e.g., around 3 percent, and relatively large Young's modulus, e.g. 260 GPa. The specific silicon nitride that is used is a silicon rich nitride deposited at 860 degrees C. with a $SiH_2Cl_2:NH_3$ gas flow ratio of 4:1. Unlike stoichiometric $Si_3N_4$, this silicon-rich nitride may include lower residual stress; allowing the diaphragm to be made thicker, e.g., as thick as 5 um.

The diaphragm itself may be round in outer section to improve stress concentration along the diaphragm. The diameter d of the diaphragm is shown in FIG. 1.

Two important parameters to consider when forming the diaphragm may include the thickness h and the radius a=d/2. The ratio of a/h should be small enough so that the diaphragm can sustain under high-pressure. On the other hand, sensitivity of the device may be increased by a larger ratio. A trade-off between these two requirements may exist.

The deflection of the center, $y_0$ of the diaphragm may be approximated by the following equation:

$$\frac{pa^4}{Eh^4} = \frac{16}{3(1-v^2)}\frac{y_0}{h} + \frac{7-v}{3(1-v)}\frac{y_0^3}{h^3} \quad (1)$$

Where p is the applied pressure, E represents Young's modulus, and v represents Poisson's ratio of the low-pressure chemical vapor deposited silicon nitride.

However, equation (1) is for a edge-clamped, absolutely flat circular diaphragm. In the real case, the surface is not really flat, due to the step-up anchor and bird's beak that are described herein. The actual deflection may be different than the value calculated from equation (1). When optimizing the pressure sensor design, it may become necessary to use the data from real measurement.

The depth, r, of the cavity may also determine the overpressure protection characteristics. In an ideal case, the value r should be precisely equal to $y_0$, e.g., within 10%. For example, for a 1 um deep overpressure protection, the cavity depth may be 1.1 um.

Figure 2:
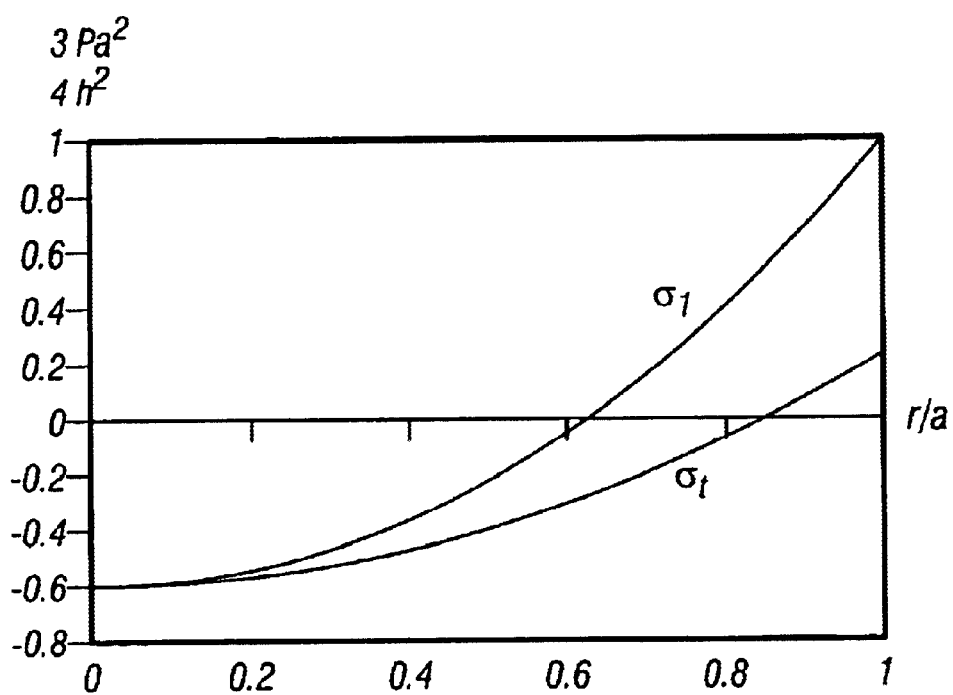
FIG. 2 shows the analytical longitudinal and transverse stress distribution along the surface of a circular diaphragm with clamped edges.

FIG. 2 shows an exemplary stress distribution along the radius for an ideal clamped circular diaphragm, assuming small deflection. According to this distribution, the device may work best when the layout of the strain sensitive resistor does not exceed one third of the radius. However, this is for the ideal case, and the real distribution will approximate this ideal case. The best strain sensitive resistor should be made as small as possible and close to the edge in order to increase the sensitivity. This may be limited by lithography capability and by the requirement for total resistance as described herein.

The fabrication of this device is shown in FIGS. 3A–3F, and described herein.

Figure 3A:
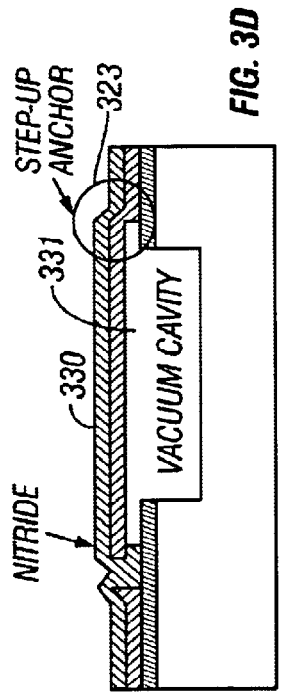
FIGS. 3a–3f show a first formation technique.

In FIG. 3A, a silicon wafer 300 is obtained with a silicon nitride layer 302 thereon. The silicon nitride layer may be deposited using conventional techniques, for example. The silicon nitride layer may be, as described above, a low stress silicon nitride layer. As shown in FIG. 3a, a window 305 may be formed in the silicon nitride layer 302. The window may also be etched further into the silicon layer 300 in order to obtain a desired depth trench.

Figure 3B:
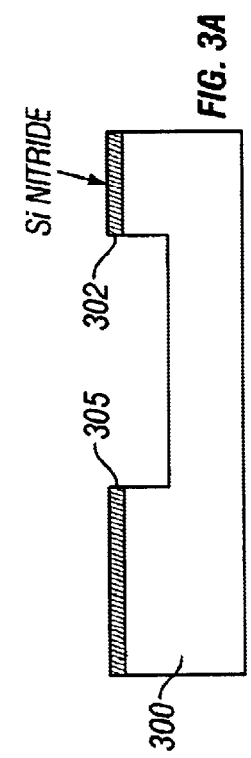

In FIG. 3b, the etched trench is filled with a sacrificial material. Different materials can be used as the sacrificial layer. In this embodiment, the sacrificial material may be formed using local oxidation of silicon (LOCOS) to form a thermal silicon dioxide layer 310.

The entire device, including the sacrificial layer, e.g., thermal silicon dioxide layer 310, may then be planarized using HF dip.

Also in FIG. 3B, a phosphosilicate glass (PSG) layer 312 may be deposited. The PS glass layer 312 is patterned and annealed to form the etching channels. PSG has the interesting feature that it can be "reflowed" easily around 1050 degrees C. The operation of reflowing consists of heating the glass until it is soft, but not completely melted. Residual stresses in the glass may be released. Importantly, the edges of the glass are inherently rounded by the reflow operation. This reflow capability may hence avoid sharp angles at the boundary formed during the etching process. By rounding the areas of these boundaries, stress concentration may be reduced. This property is very important for the diaphragm to survive in high pressure.

Figure 3C:
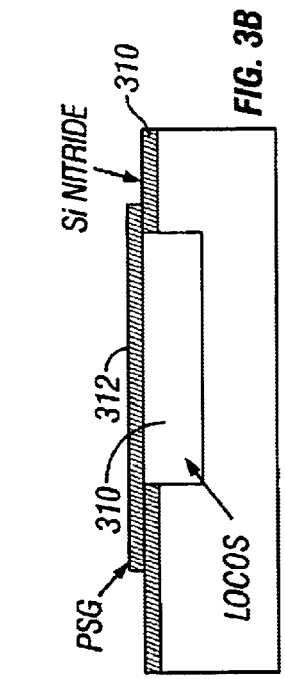
Figure 8:
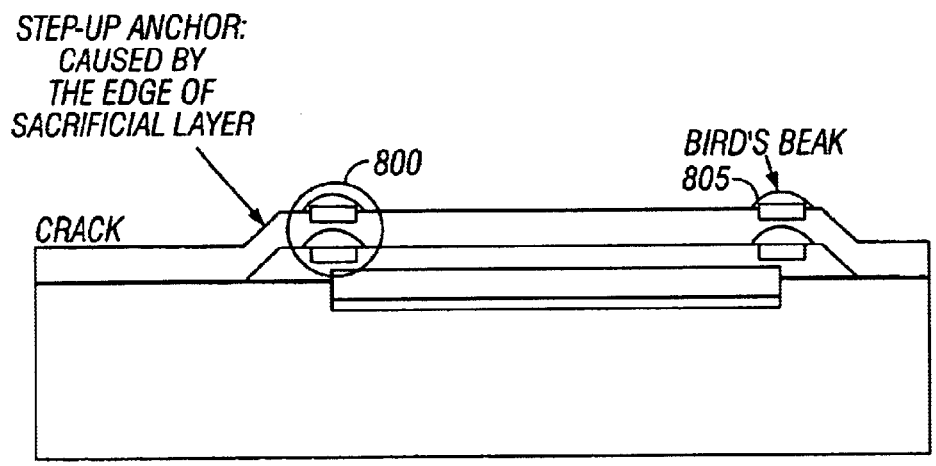
FIG. 8 shows how a nonideal diaphragm may be formed by the step-up anchor and bird's beak phenomenon.

In FIG. 3C, a silicon nitride layer 320 is deposited over the PSG layer, which may be approximately 1.5 microns in thickness. This low stress silicon nitride may then be patterned to open the etching holes such as 321. Note the areas where the PSG layer 312 is covered by the silicon nitride may form step up anchor like 323. As shown in FIG. 8, nonideal diaphragm may be formed by the step up anchor and bird's beak phenomenon. The step up anchor is formed by the edge of the sacrificial layer, which is PSG herein. The bird's beak is caused by the lateral diffusion of oxidation during the LOCOS step. This lateral diffusion may cause an increase in the volume of the substrate, thus causing the geometric shape change referred to herein as the bird's beak.

Figure 3D:
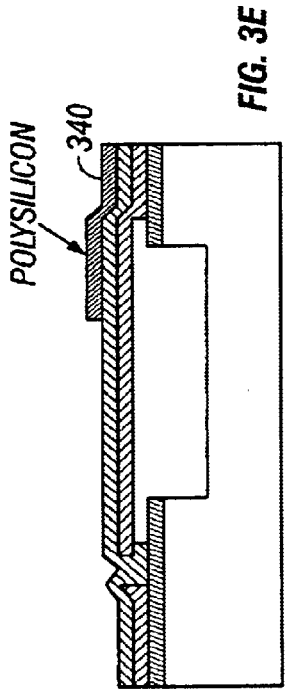

In FIG. 3D, the sacrificial layer, here PSG and silison dioxide layer 310, may be removed using a 49 percent HF solution to release the silicon nitride diaphragm. After etching away the sacrificial/pSG layer, the cavity height will be decreased by about 10% due to the tensile stress of the LPCVD silicon nitride. This also leaves a vacuum chamber 331. This decrease may also be considered when optimizing the design.

A second silicon nitride layer 330 may be formed over the first silicon nitride layer to a thickness to reach the desired silicon nitride thickness and seal the cavity at the same time.

In another embodiment, a multi-layer structure may be formed. For example, silicon nitride can be deposited first to seal the cavity, followed by deposition of polysilicon and then silicon nitride again. In this way, a much thicker diaphragm can be fabricated. The polysilicon layer can also be used as an electrode in capacitive sensing.

Figure 3E:
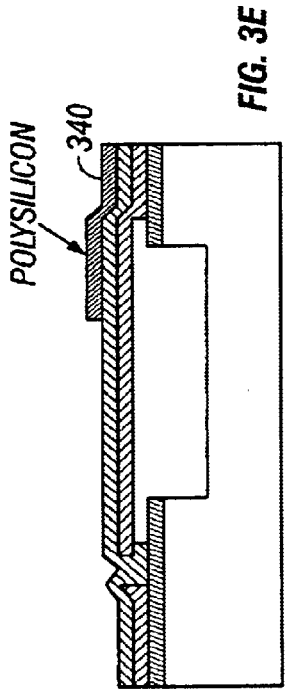

In FIG. 3E, the polysilicon films 340, which will form the strain sensitive resistors, are deposited. There films may be 5000 angstroms in thickness. The films may be deposited, doped, and patterned to form the eventual sensing resistors. Each of the polysilicon films may be doped twice.

The first doping carries out a global boron implantation at a dose of $10^{15}/cm^2$. This may minimize the temperature coefficient of resistance. A second doping process implants a selective high dose of boron ion, e.g. $10^{16}/cm^2$ on the temperature sensors and also on the contacts. This may also be deposited on the turning around sections of the polysilicon resistors. This may be carried out to minimize the non-effective resistance. A patterned photoresist layer may be used as the dope mask during the heavy dope at desired areas.

The temperature coefficient of resistance of this heavily doped polysilicon is about 0.1 percent per degrees centigrade.

Figure 3F:
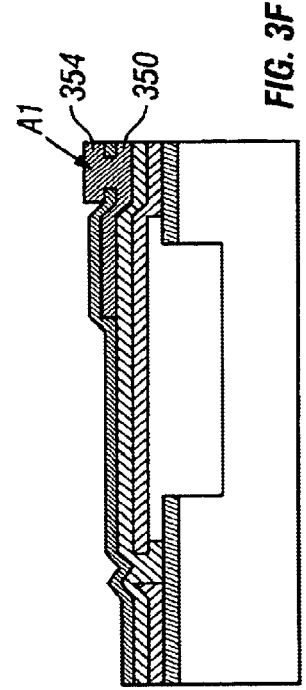

Another 2000 angstrom silicon nitride is deposited as a passivation layer 350 as shown in FIG. 3F. The final silicon nitride layer 350 is then etched to open contact holes 352. The contact holes are filled with aluminum 354. Finally, aluminum is patterned and the wafer is diced into pieces, e.g. of 3×3 square milimeters.

Figure 4:
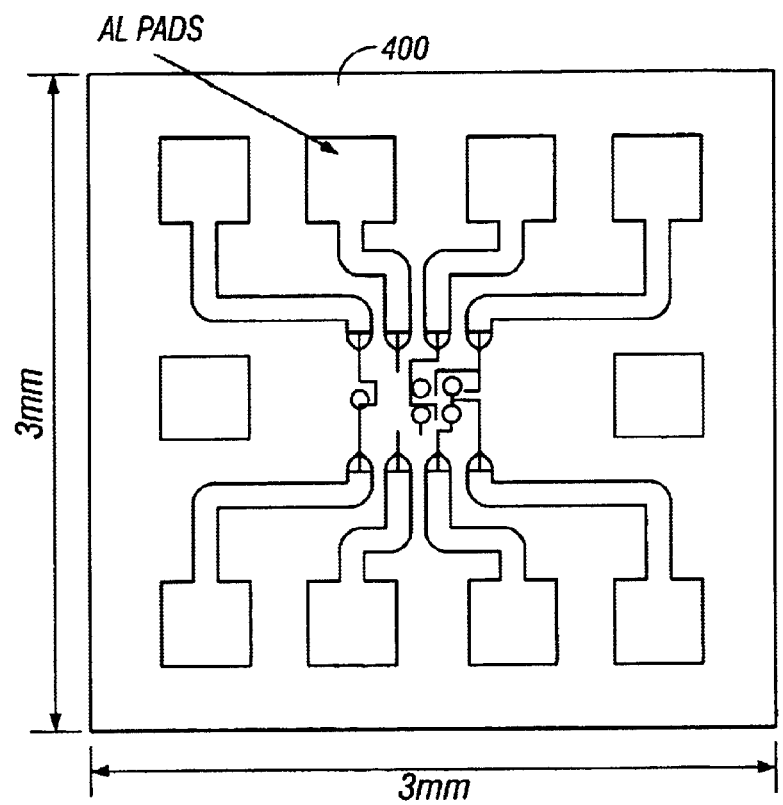
FIG. 4 shows a diagram of the pads and the chip used in an ideal system.
Figure 5:
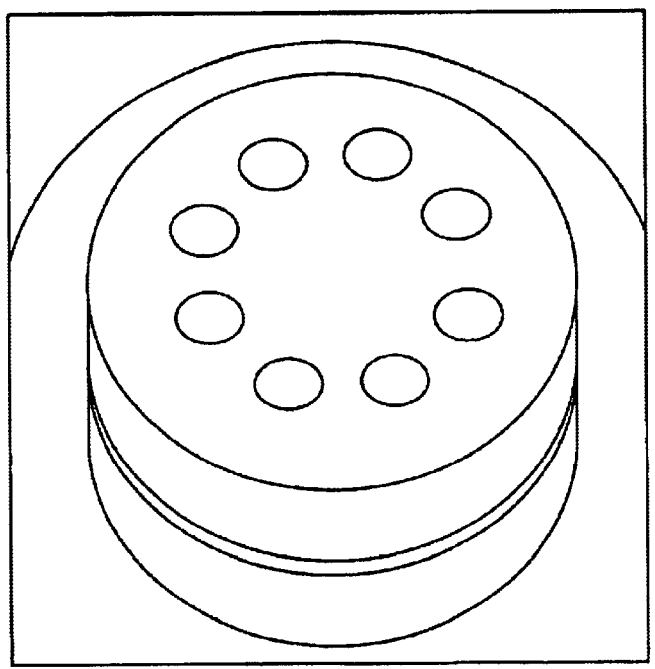
FIG. 5 shows how the chip may be wire bonded to a metal header.

FIG. 4 shows a diced sensor chip with the aluminum pads 400, leading to the resistors. FIG. 5 shows the chip wire bonded to a metal header.

Figure 6:
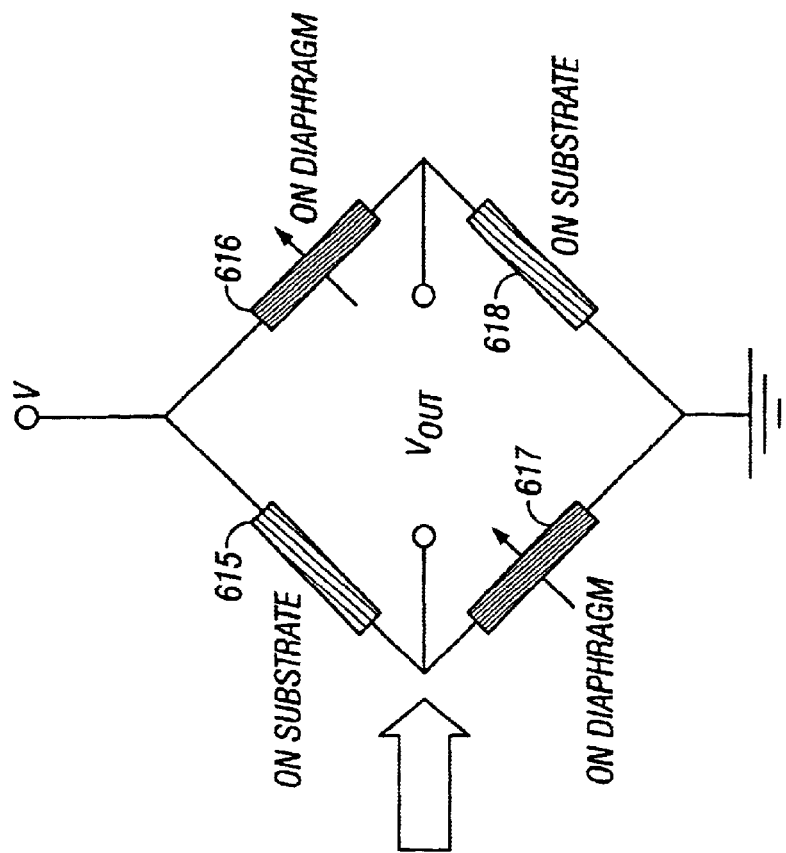
FIG. 6 shows details of the device, with a number of resistors forming a Wheatstone Bridge.
Figure 6:
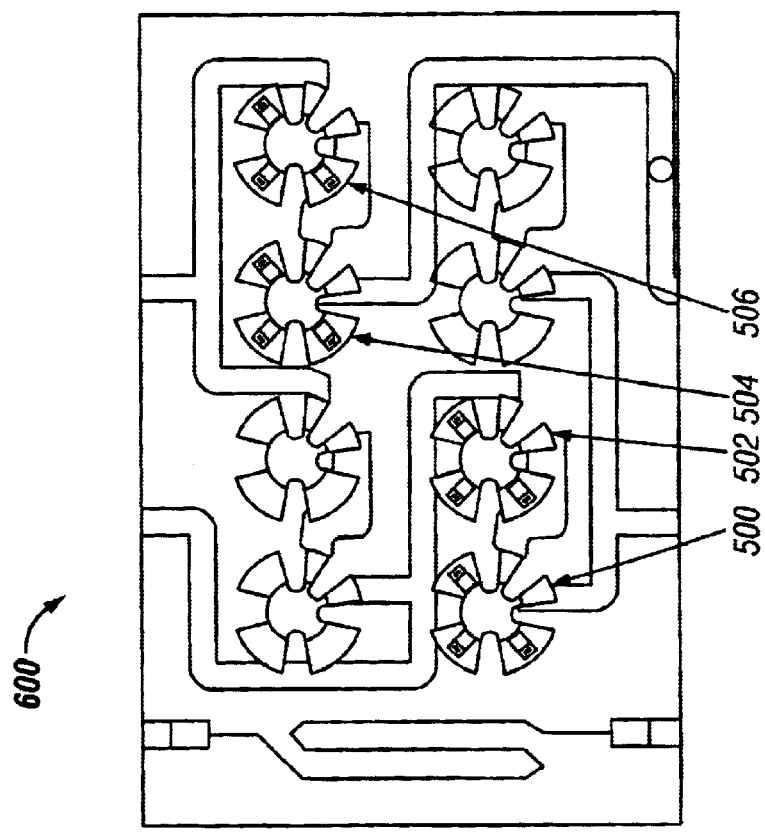

FIG. 6 shows further details of the device. The temperature sensor includes a polysilicon thermistor 600 used for temperature compensation. Four silicon nitride diaphragms 500, 502, 504, 506 may be used. The multiple diaphragm configuration may be used to avoid the self-heating effect. Self heating may be due to the small diaphragm size, and thermal isolation within the vacuum cavity. Strain sensitive resistors 605 are allocated among the multiple diaphragms to increase the resistance and thereby decrease the total power consumed. Moreover, the power may be dissipated over a larger area to further reduce the power density. In an embodiment, half of the polysilicon resistors may be formed on the silicon nitride diaphragm, with the other half being formed on the silicon nitride diaphragm, with the other half being formed on the silicon substrate.

FIG. 6 shows the piezoresistors arranged as a Wheatstone bridge, with some of the resistors 615, 618 on the substrate, and others of the resistors 616, 617 on the diaphragm. This may be formed by resistors which are on the diaphragms, and to other resistors which are off of the diaphragms, e.g. on the substrate.

Figure 7:
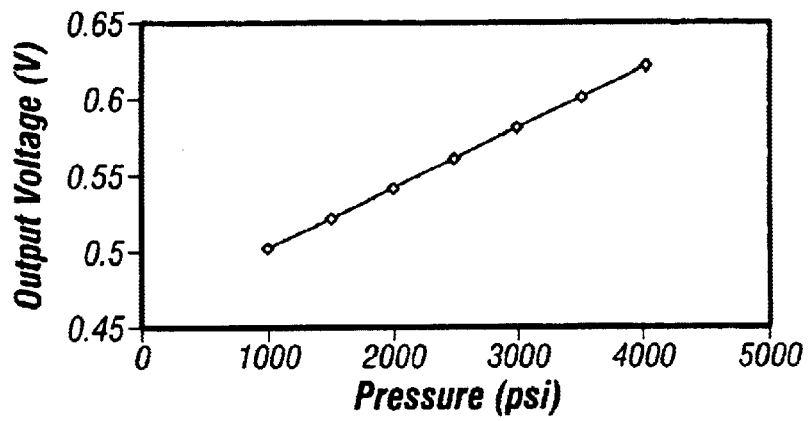
FIG. 7 shows a calibration curve.

Conventional techniques may be used to calibrate the sensor. For example, the sensor may be calibrated using a deadweight tester gauge. A calibration curve, such as shown in FIG. 7, may be developed. Moreover, the same testing technique may be used to determine sensitivity to temperature drift.

As the size of the diaphragm increases, the inventor found that cracks 800 may occur at boundaries of the diaphragm. These cracks may be especially problematic at areas of the edges of the sacrificial layer especially at areas of the bird's beak 805. For example, FIG. 8 shows how cracks may occur at those edge areas.

Different techniques may be carried out to avoid sharp angles at the boundaries in order to minimize the chance to crack. For example, the PSG may be reflowed at 1050 degrees C. to avoid sharp angles at the boundary.

The additional operations may be carried out to improve this sensor. One operation may reduce the ratio of a to h in order to increase the measurement range of the sensor. In one embodiment, the depth of the cavity is substantially equal to the maximum deflection $y_0$ of the diaphragm in order to implement overpressure protection. By carefully choosing the diaphragm thickness and diameter, $y_0$ can be as small as 0.4 um when maximum pressure is applied. This thickness can be realized using one single layer of PSG as the sacrificial material, obviating the need for the LOCOS process. This layer of PSG forms the cavity and etching channels at the same time. This may simplify the process, and avoid the bird's beak on the diaphragm.

FIGS. 10A–10F show a second fabrication process which may include certain advantages. In the second fabrication process of FIGS. 10A–10F, the LOCOS step is eliminated. This may be relatively important. In the previous system, the LOCOS process has been difficult to implement since there is no etch stop. This means that the process needs to be monitored very carefully to obtain a desirable depth. By eliminating this step, the fabrication process may be simplified significantly and the cavity depth can be controlled much more precisely.

In FIG. 10 A, a first mask process is shown, in which a layer of PSG 1000 is formed on the silicon substrate 999. The PSG is deposited, and patterned, and reflowed, as described above.

In FIG. 10 B., the silicon nitride layer 1010 is deposited, and etching holes such as 1012 are opened.

FIG. 10 C. removes the sacrificial PSG layer 1000, using concentrated HF. This leaves an opening 1020 which eventually becomes the vacuum cavity. The vacuum cavity is subsequently covered by multiple silicon nitride layers as shown in FIG. 10 D.

Figure 10D:
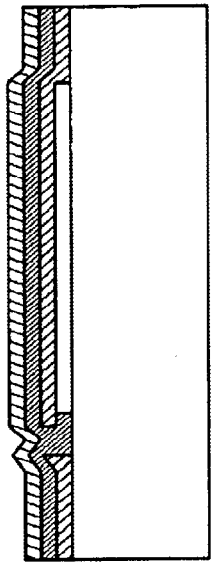
FIGS. 10A–10F show process formation for the second embodiment.
Figure 10E:
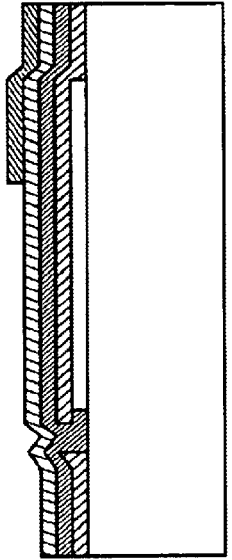
Figure 10F:
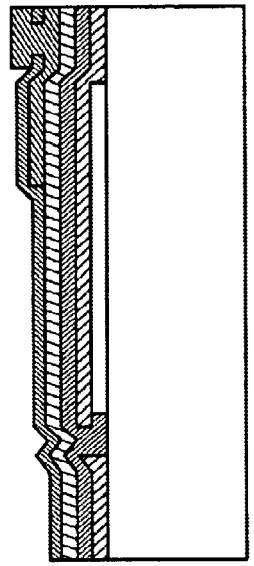
Figure 10A:
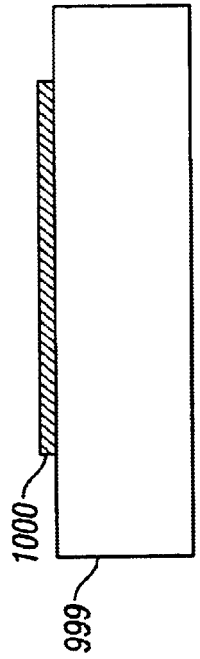
Figure 10B:
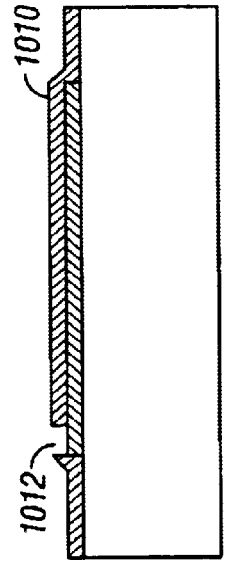
Figure 10C:
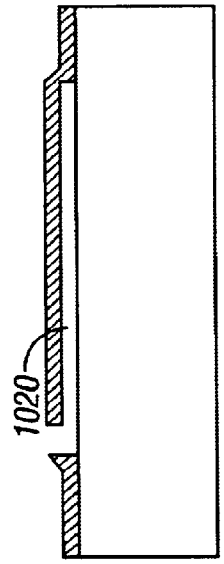

FIG. 10E shows masks No. 3 and 4 which are used to deposit, dope and pattern the polysilicon.

In FIG. 10 F, a thin silicon nitride is formed e.g. 0.2 microns, contact holes are opened, and aluminum metallization is added. This may use masks numbers 5 and 6 for this process.

An important feature of this second process, is that the cavity and the etching channel are formed at the same time, in one single step. This means, therefore, that the channels are automatically aligned, and also simplifies the formation process.

Figure 9:
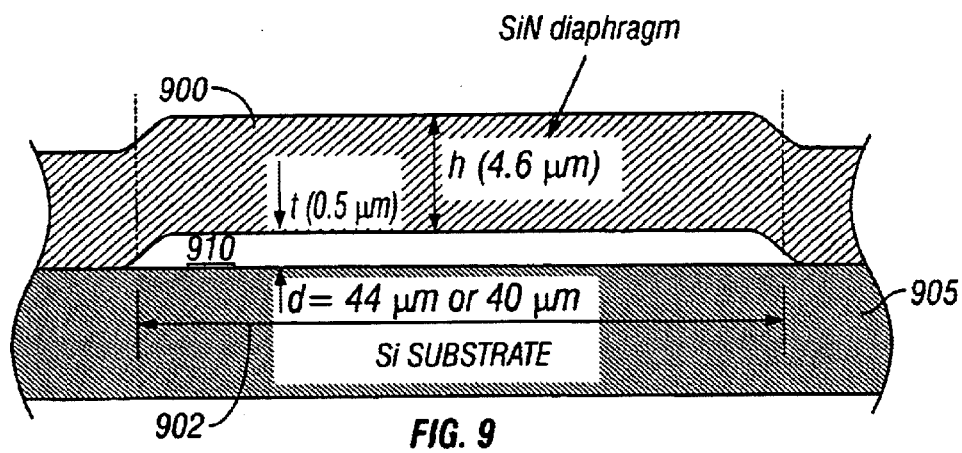
FIG. 9 shows a crosssection of a second embodiment.

FIG. 9 shows a cross-section of this circular diaphragm. As can be seen in FIG. 9, the diameter 902 of the diaphragm is defined by the area where the silicon nitride element 900 is raised above the silicon substrate 905 to form a vacuum cavity 910. The silicon nitride diaphragm may have a thickness H of 4.6 microns, and the vacuum cavity may have a thickness t of 0.5 microns.

This second process may increase the diaphragm thickness to 4.6 um and may decrease the diameter to 40 um. The pressure range is ~14,000 psi. This system may also have inherent overpressure protection property, which may be very desirable in certain applications.

Significant process improvements may also be found in this new run. By eliminating the LOCOS process, the birds beak phenomenon is eliminated.

In one embodiment, the design layout is not symmetric. If zero pressure is provided, then the resistances of the piezoresistors on the diaphragm might not be equal, at least partly due to the presence of the step up anchor, and the birds beak. The offset voltage may be nonzero, e.g. as large as 0.1 volts with 1 volt excitation voltage.

Figure 11:
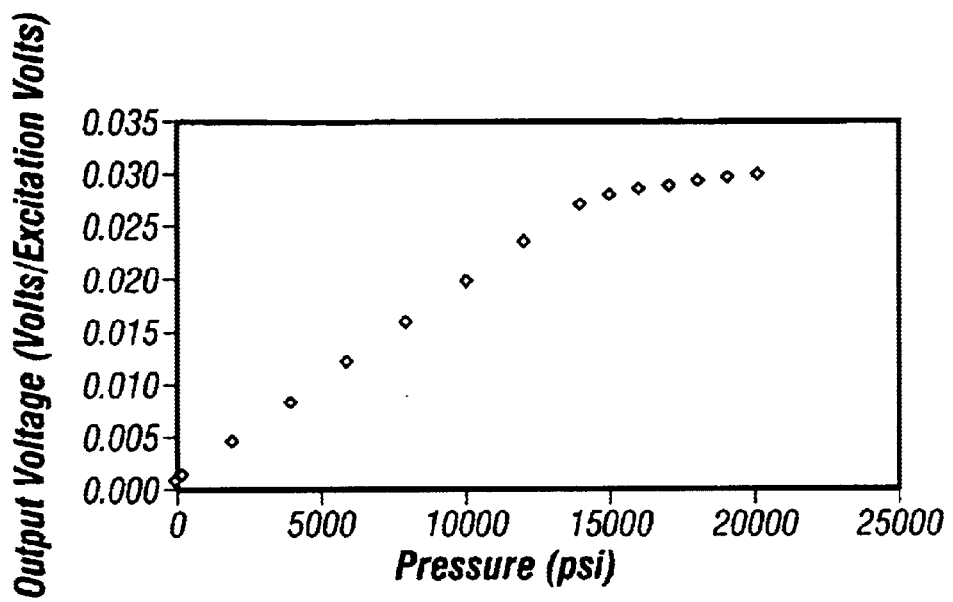
FIG. 11 shows calibration curves for the second embodiment.

This offset voltage may be minimized by using non-active resistors on "dummy" diaphragms. The dummy diaphragms may be the same as the real diaphragms except that the sacrificial materials, such as PSG, need not be removed from those dummy diaphragms. These dummy diaphragms may therefore have the same surface profiles as the real diaphragms and therefore active and non-active resistors may have same resistances. The second embodiment may also use this dummy diaphragm scheme. The offset voltage is reduced considerably, e.g., there may be only a few mV when 1V excitation voltage is applied. The sensitivity is shown in FIG. 11. FIG. 11 also shows the inherent overpressure protection.

Figure 12:
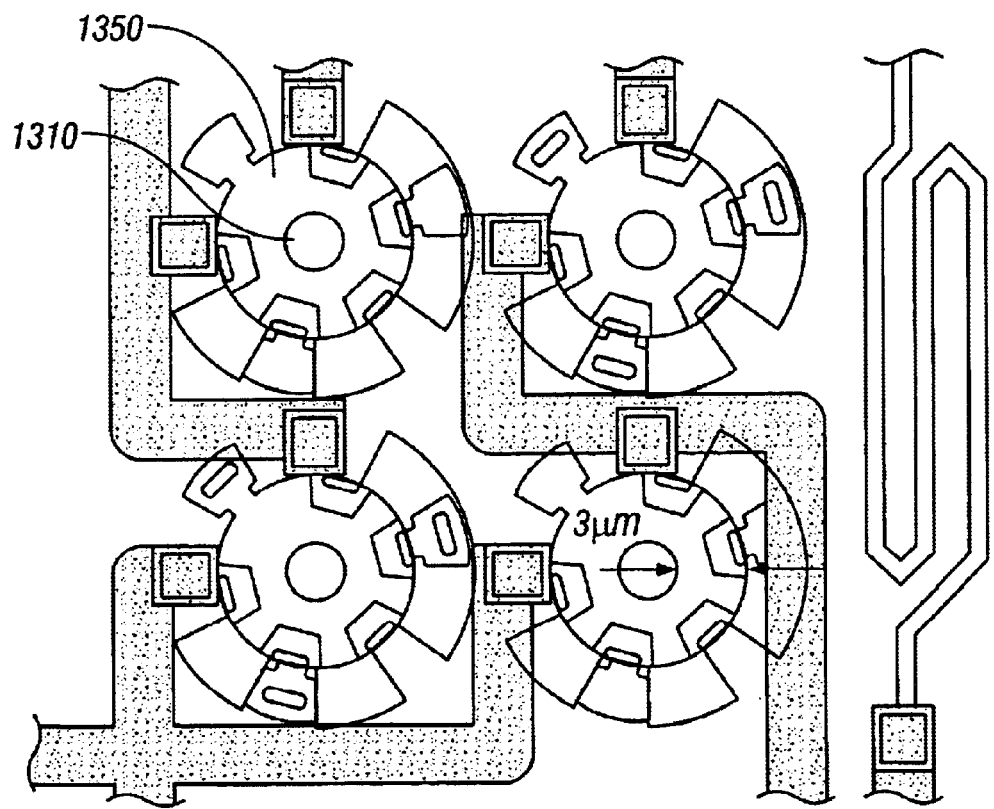
FIG. 12 shows another embodiment formed as a doughnut structure.
Figure 13:
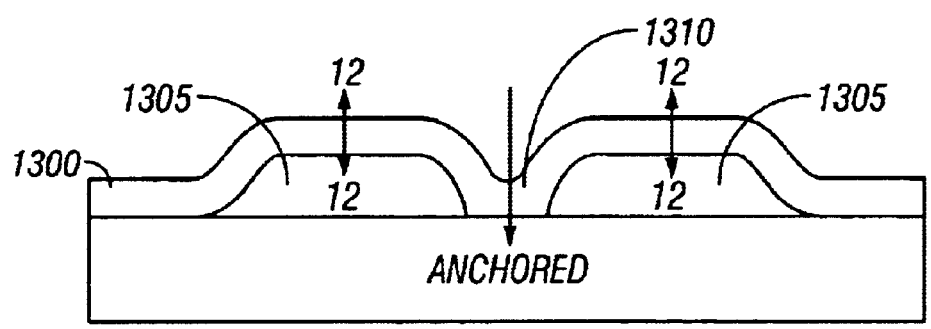
FIG. 13 shows a cross-section of this doughnut structure.

Another embodiment may form a pressure sensor with a so-called doughnut structure as shown in FIG. 12, with a cross-section being shown in FIG. 13. In the "doughnut" embodiment, the silicon nitride membrane 1300 forms a doughnut shaped cavity 1305 which is anchored in the center shown as 1310. The cavity shaped 1305 can be seen in the top view of FIG. 12, along with the anchor 1310. Since the cavity is anchored in the center, even higher pressure capabilities are possible. FIG. 12 shows how a plurality of the doughnut structures can be connected together. This system may operate at a much higher pressure range, e.g., 30,000 psi.

Although only a few embodiments have been disclosed in detail above, other modifications are possible.

For example, in order to improve the stability, heavily doped polysilicon may be used as the piezoresistor, for example polysilicon that is doped to $10^{16}/cm^2$. This same doping value may be used for the contact area. This may also produce the advantage of requiring only one single global, but heavy, dope operation. This may also allow elimination of one of the lithography step which patterns the mask for the heavily dope. Thus, this may be a further simplification of the process.

The process of the $2^{nd}$ run is pure surface micromachined. The wafer only serves as carrier. If necessary, other type of wafers, e.g., which have same thermal expansion coefficients as silicon nitride, can be used to reduce thermal mismatch.

Other sacrificial materials such as borophosphosilicate glass (BPSG) can be used so that a reflow temperature as low as 700 degree C. can be obtained.

In addition to polysilicon, metals such as platinum may be used as strain sensitive resistors.

Silicon Carbide may also be used as the diaphragm material.

Strain sensitive resistors may also be put in the central region of the diaphragm to utilize the negative strain so that a higher sensitivity may be achieved.

Other operating principles such as capacitive sensing and piezoelectric sensing are also possible.

All such modifications are intended to be encompassed within the following claims, in which:

What is claimed is:

1. A device, comprising:

a substrate; and a surface micromachined pressure sensor, formed on said substrate, and formed to be capable of sensing pressures that are greater than 6000 psi;

wherein said pressure sensor includes a diaphragm material, and a plurality of strain sensitive resistors, formed in said diaphragm material;

wherein said strain sensitive resistors are piezoresistors; and a vacuum cavity, under said diaphragm material, said cavity having a depth that is based on overpresaure protection characteristics.

2. A device as in claim 1, wherein said depth of said cavity is substantially equal to an amount of deflection of the diaphragm at a specified maximum pressure.

3. A device, comprising:

a substrate; and a surface micromachined pressure sensor, formed on said substrate, and formed to be capable of sensing pressures that are greater than 6000 psi;

wherein said surface micromachined pressure sensor includes a diaphragm layer, formed from a silicon nitride layer; and at least one additional resistor, formed on an area other than said diaphragm layer, but formed on said substrate, said at least one additional resistor being sized to compensate for an offset voltage.

4. A device as in claim 3, wherein said surface micromachined pressure sensor includes a diaphragm, and further comprising a dummy diaphragm having at least one similar characteristic to said diaphragm.

5. A device as in claim 4, wherein said at least one additional resistor is formed on said dummy diaphragm.

6. A device, comprising:

a substrate; and a surface micromachined pressure sensor, formed on said substrate, and formed to be capable of sensing pressures that are greater than 6000 psi;

an over pressure protection part, integral with said device, and protecting said device against pressures which are higher than a designed-for specified amount.

7. A device as in claim 6, further comprising a diaphragm layer, and a vacuum chamber under said diaphragm layer, and wherein said over pressure protection part is formed by a depth of said vacuum chamber which limits an allowable deflection of said diaphragm layer.

8. A device as in claim 6, further comprising a diaphragm layer, and a vacuum chamber under said diaphragm layer, with a post in a substantially central area of said vacuum chamber, limiting a deflection of said diaphragm layer.

9. A device, comprising:

a substrate;

a surface micromachined pressure sensor, formed on said substrate, and capable of sensing pressures greater than 6000 psi, said pressure sensor including a deformable diaphragm, coupled to said substrate, and connected at least around a perimeter thereof to said substrate, and separated from said substrate to form a cavity under said diaphragm between said diaphragm and said substrate, said deformable diaphragm having an outer perimeter size which is less than 100 microns, and having a thickness which is greater than three microns.

10. A device as in claim 9, wherein said substrate includes a peg portion at an area near a center of said diaphragm, and wherein said diaphragm portion is also connected to said extending portion.

11. A device as in claim 9, wherein said diaphragm is formed of a plurality of layers.

12. A device as in claim 11, wherein at least one of said layers is formed of silicon nitride.

13. A device as in claim 12, wherein at least one of said layers is formed of polysilicon.

14. A device, comprising:

a substrate; and a surface micromachined pressure sensor, having a deformable membrane formed adjacent said substrate, said membrane having an outer size from edge to edge which is less than 100 microns, and having a thickness that is capable of withstanding a pressure that is greater than at least 6000 psi.

15. A device as in claim 14, wherein said membrane has a thickness that allows it to withstand a pressure of at least 10,000 P.S.I.

16. A device as in claim 14, wherein said membrane is attached to said substrate along an outer periphery thereof, and also at a center thereof.

17. A device as in claim 14, further comprising a capacitive sensor, sensing an amount of deflection of said diaphragm.

18. A device as in claim 14, further comprising a vacuum cavity, under said diaphragm material, said cavity having a depth that is based on desired overpressure protection characteristics.

19. A device an in claim 18, wherein said depth of said cavity is substantially equal to an amount of deflection of the diaphragm at a specified maximum pressure.

20. A device as in claim 14, further comprising a plurality of strain sensitive resistors, formed within said membrane.

21. A device as in claim 20, further comprising at least one additional resistor, formed on a part of said substrate other than said membrane, said at least one additional resistor being sized to compensate for an offset voltage.

22. A device as in claim 20, wherein said resistors are formed of polysilicon.

23. A device as in claim 20, wherein said resistors are formed of platinum.

24. A device as in claim 14, wherein said surface micromachined pressure sensor element includes a silicon nitride layer.

25. A device as in claim 24, wherein said membrane is formed of a plurality of layers.

26. A device as in claim 25, wherein each of said plurality of layers includes silicon nitride.

27. A device as in claim 25, wherein at least one of said plurality of layers includes silicon nitride, and another of said layers includes polysilicon.

* * * * *

UNITED STATES PATENT AND TRADEMARK OFFICE
CERTIFICATE OF CORRECTION

PATENT NO. : 6,782,755 B2
DATED : August 31, 2004
INVENTOR(S) : Tai et al.

It is certified that error appears in the above-identified patent and that said Letters Patent is hereby corrected as shown below:

<u>Title page,</u>
Item [75], Inventors, add -- William A. Loomis, Ridgefield CT (US). --.

Signed and Sealed this

Seventh Day of March, 2006

JON W. DUDAS
*Director of the United States Patent and Trademark Office*